US012630316B2

(12) United States Patent
Ho

(10) Patent No.: US 12,630,316 B2
(45) Date of Patent: May 19, 2026

(54) UNMANNED AERIAL VEHICLE

(71) Applicant: Qisda Corporation, Taoyuan City (TW)

(72) Inventor: Wen-Chung Ho, Taoyuan City (TW)

(73) Assignee: Qisda Corporation, Taoyuan City (TW)

( * ) Notice: Subject to any disclaimer, the term of this patent is extended or adjusted under 35 U.S.C. 154(b) by 114 days.

(21) Appl. No.: 18/748,012

(22) Filed: Jun. 19, 2024

(65) Prior Publication Data

US 2026/0048861 A1 Feb. 19, 2026

(30) Foreign Application Priority Data

Jul. 13, 2023 (CN) .......................... 202310861338.5

(51) Int. Cl.
  B64U 20/50 (2023.01)
  B64U 10/14 (2023.01)
(52) U.S. Cl.
  CPC ............. B64U 20/50 (2023.01); B64U 10/14 (2023.01)
(58) Field of Classification Search
  CPC ........ B64U 20/50; B64U 10/10; B64C 1/063; B64C 1/30; Y10T 292/101; Y10T 292/1039; E05C 1/06
  See application file for complete search history.

(56) References Cited

U.S. PATENT DOCUMENTS 2,822,108 A  *  2/1958  Moeller ................. B65D 39/12
                                                      220/238
2021/0214068 A1* 7/2021 Bry ...................... B64U 30/293

FOREIGN PATENT DOCUMENTS

CN        106240794       7/2018
CN        107458577       5/2020

* cited by examiner

*Primary Examiner* — Ashesh Dangol
(74) *Attorney, Agent, or Firm* — JCIPRNET

(57) ABSTRACT

An unmanned aerial vehicle includes a body, a shaft base, an arm, a triggering member, and a linking member. The shaft base is disposed outside the body. The arm includes a shaft member. The shaft member is movably pivoted on the shaft base along a first axis, so that the arm is folded to the body or unfolded from the body. The triggering member includes an eccentric cam, and a rotation center of the eccentric cam is rotatably disposed on the shaft base along a second axis, so that the triggering member rotates between a fixed position and a release position. The linking member includes a rod and a stopper. The rod extends along the first axis and is movably passed through the shaft member. The rod is disposed between the eccentric cam and the stopper, and the rod extends to the rotation center of the eccentric cam.

8 Claims, 8 Drawing Sheets

UNMANNED AERIAL VEHICLE

CROSS-REFERENCE TO RELATED APPLICATION

This application claims the priority benefit of China application serial no. 202310861338.5, filed on Jul. 13, 2023. The entirety of the above-mentioned patent application is hereby incorporated by reference herein and made a part of this specification.

BACKGROUND

Technical Field

The disclosure relates to an unmanned aerial vehicle, and in particular to an unmanned aerial vehicle with easy portability and an arm of which may be well fixed to be operated easily.

Description of Related Art

In recent years, the development of unmanned aerial vehicles has been in the ascendant, and the applications are springing up in the fields of military, transportation, monitoring, and aerial photography. How to make the unmanned aerial vehicle easy to carry with the arms providing good stability and easy operation is the direction of research in this field.

The coupling structure of the folding arms and the body of existing foldable unmanned aerial vehicles is relatively loose. During the flight of the unmanned aerial vehicle, the arms tend to shake severely, causing the unmanned aerial vehicle to lose its balance, which is not conducive to flight safety; or the locking structure of the arm is complicated and inconvenient for users to operate. Moreover, when the foldable unmanned aerial vehicle is stored after use, the arms are not folded compactly enough and are easy to loosen, making it inconvenient to carry, and thus the safety of storage and transportation of the unmanned aerial vehicle is not effectively guaranteed.

Therefore, it is necessary to design a new type of unmanned aerial vehicle to overcome the above shortcomings.

SUMMARY

The disclosure provides an unmanned aerial vehicle, the arm of which may be folded for easy portability and may be well fixed when folded or unfolded, which is easy to operate.

An unmanned aerial vehicle according to an embodiment of the disclosure includes a body, a shaft base, an arm, a triggering member, and a linking member. The shaft base is disposed outside the body. The arm includes a shaft member. The shaft member is movably pivoted on the shaft base along a first axis, so that the arm is folded to the body or unfolded from the body. The triggering member includes an eccentric cam. A rotation center of the eccentric cam is rotatably disposed on the shaft base along a second axis, so that the triggering member rotates between a fixed position and a release position. The linking member includes a rod and a stopper. The rod extends along the first axis and is movably passed through the shaft member. The rod is disposed between the eccentric cam and the stopper, and the rod extends to the rotation center of the eccentric cam. When the triggering member is rotated to the fixed position, the shaft member is clamped between an outer edge of the eccentric cam and the stopper, so that the arm is fixed on the shaft base. When the triggering member is rotated to the release position, a distance between the outer edge of the eccentric cam and the stopper increases, so that there is at least one gap between at least one of the outer edge of the eccentric cam and the stopper and the shaft member, allowing the arm to be adapted to rotate relatively to the shaft base.

In an embodiment of the disclosure, the outer edge of the eccentric cam includes a first area and a second area. A distance between the first area and the rotation center is greater than a distance between the second area and the rotation center. When the triggering member is rotated to the fixed position, the first area abuts the shaft member. When the triggering member is rotated to the release position, the second area abuts the shaft member.

In an embodiment of the disclosure, the shaft base covers and surrounds the shaft member. The shaft member includes a cone outer surface extending along the first axis. The shaft base includes a cone inner surface corresponding to the cone outer surface. When the triggering member is rotated to the fixed position, the cone outer surface of the shaft member abuts against the cone inner surface of the shaft base.

In an embodiment of the disclosure, an outer diameter of the cone outer surface gradually increases from the eccentric cam toward the stopper.

In an embodiment of the disclosure, the body includes a carrier. The shaft base is disposed on the carrier. The shaft member is located between the shaft base and the carrier. The carrier includes a first hole. The rod passes through the first hole and the stopper is located beside a lower surface of the carrier away from the shaft base.

In an embodiment of the disclosure, the shaft member includes a lower protrusion located in the first hole of the carrier. When the triggering member is rotated to the fixed position, the stopper abuts the lower protrusion and the carrier at the same time.

In an embodiment of the disclosure, the shaft base includes a second hole. The shaft member includes an upper protrusion located in the second hole of the shaft base. When the triggering member is rotated to the fixed position, the outer edge of the eccentric cam abuts the upper protrusion.

In an embodiment of the disclosure, the eccentric cam includes a circular arc inner cavity located at the rotation center. The triggering member includes a pivotable circular arc body disposed in the circular arc inner cavity. The rod is inserted into the circular arc body. When the triggering member rotates between the fixed position and the release position, the eccentric cam rotates relatively to the circular arc body and drives the circular arc body and the rod to move along the first axis.

In an embodiment of the disclosure, the eccentric cam includes a fan-shaped cavity connected to the circular arc inner cavity. When the triggering member rotates between the fixed position and the release position, a relative position of the rod within the fan-shaped cavity is changed.

In an embodiment of the disclosure, the eccentric cam includes a handle portion extending outward from a radial direction of the eccentric cam.

Based on the above, the arm of the unmanned aerial vehicle of the disclosure is suitable to be folded to the body or unfolded from the body. Therefore, the arm may be folded for easy portability. In addition, the eccentric cam of the triggering member of the unmanned aerial vehicle is rotatably disposed on the shaft base, so that the triggering member rotates between the fixed position and the release position. The rod of the linking member of the unmanned aerial vehicle is disposed between the eccentric cam and the stopper, and the rod extends to the rotation center of the eccentric cam. When the triggering member of the unmanned aerial vehicle of the disclosure is rotated to the fixed position, the shaft member of the arm is clamped between the outer edge of the eccentric cam and the stopper, so that the arm is fixed on the shaft base. Therefore, the arm may be well fixed when folded or unfolded. In addition, when the triggering member is rotated to the release position, the distance between the outer edge of the eccentric cam and the stopper increases, so that there is at least one gap between at least one of the outer edge of the eccentric cam and the stopper and the shaft member. Therefore, the arm is adapted to rotate relatively to the shaft base. When the arm rotates to the desired position, the arm may be fixed by simply moving the triggering member to the fixed position again, which is easy to operate, thereby achieving effects of compact and simple structure, small size, reliability, and low maintenance cost.

DESCRIPTION OF THE EMBODIMENTS

Figure 1:
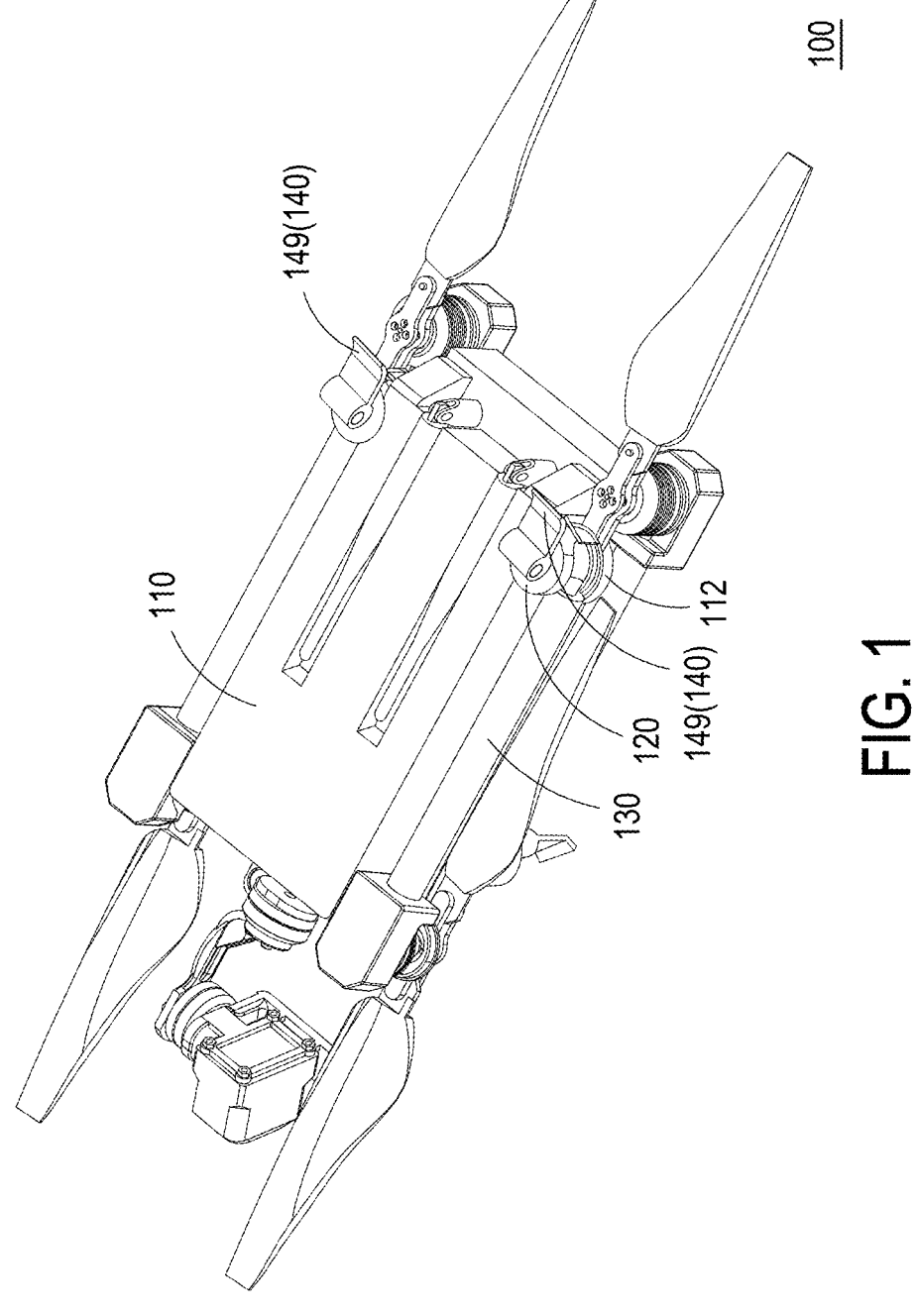
FIG. 1 is a schematic diagram of folding an arm of an unmanned aerial vehicle according to an embodiment of the disclosure.
Figure 2:
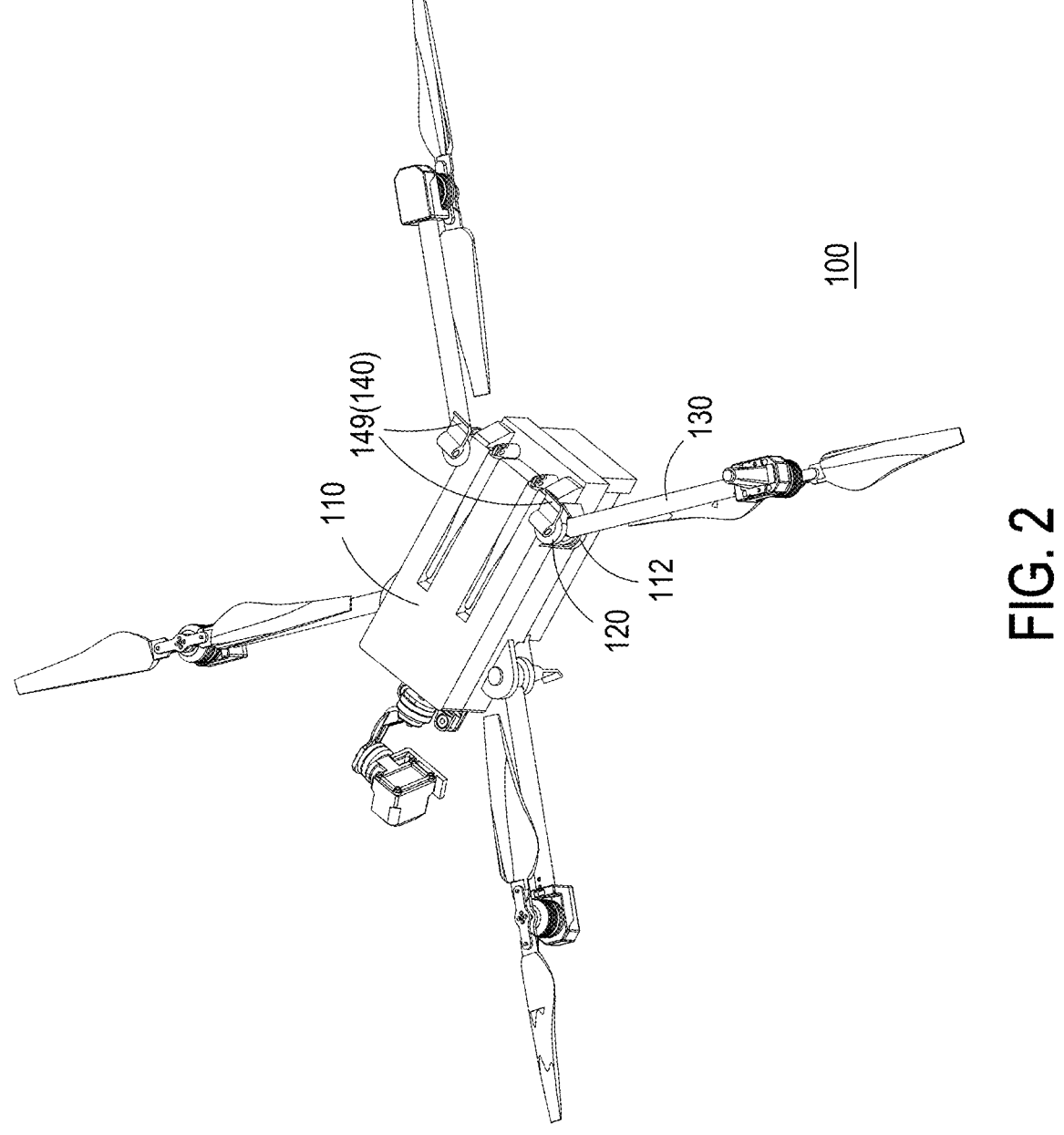
FIG. 2 is a schematic diagram of unfolding the arm of the unmanned aerial vehicle of FIG. 1.

FIG. 1 is a schematic diagram of folding an arm of an unmanned aerial vehicle according to an embodiment of the disclosure. FIG. 2 is a schematic diagram of unfolding the arm of the unmanned aerial vehicle of FIG. 1. Referring to FIGS. 1 and 2, an unmanned aerial vehicle 100 of this embodiment includes a body 110, a shaft base 120, an arm 130 and a triggering member 140. The shaft base 120 is disposed outside the body 110. The arm 130 is movably pivoted on the shaft base 120 so that the arm 130 is folded to the body 110 or unfolded from the body 110. As shown in FIG. 1, the arm 130 may be folded to a position near the body 110 to reduce an overall volume and facilitate portability. As shown in FIG. 2, the arm 130 may also unfold from the body 110 and operate when flying is required.

In this embodiment, a number of the shaft base 120, the arm 130, and the triggering member 140 is, for example, four groups, which are disposed at four corners of the rectangular body 110. However, the number of the shaft base 120, the arm 130, and the triggering member 140 is not limited thereto.

The arm 130 of this embodiment may be well fixed and is easy to operate when folded or unfolded. Hereinafter, how the arm 130 of the unmanned aerial vehicle 100 of this embodiment is fixed and unfixed is introduced by one arm 130 and the corresponding components.

Figure 3:
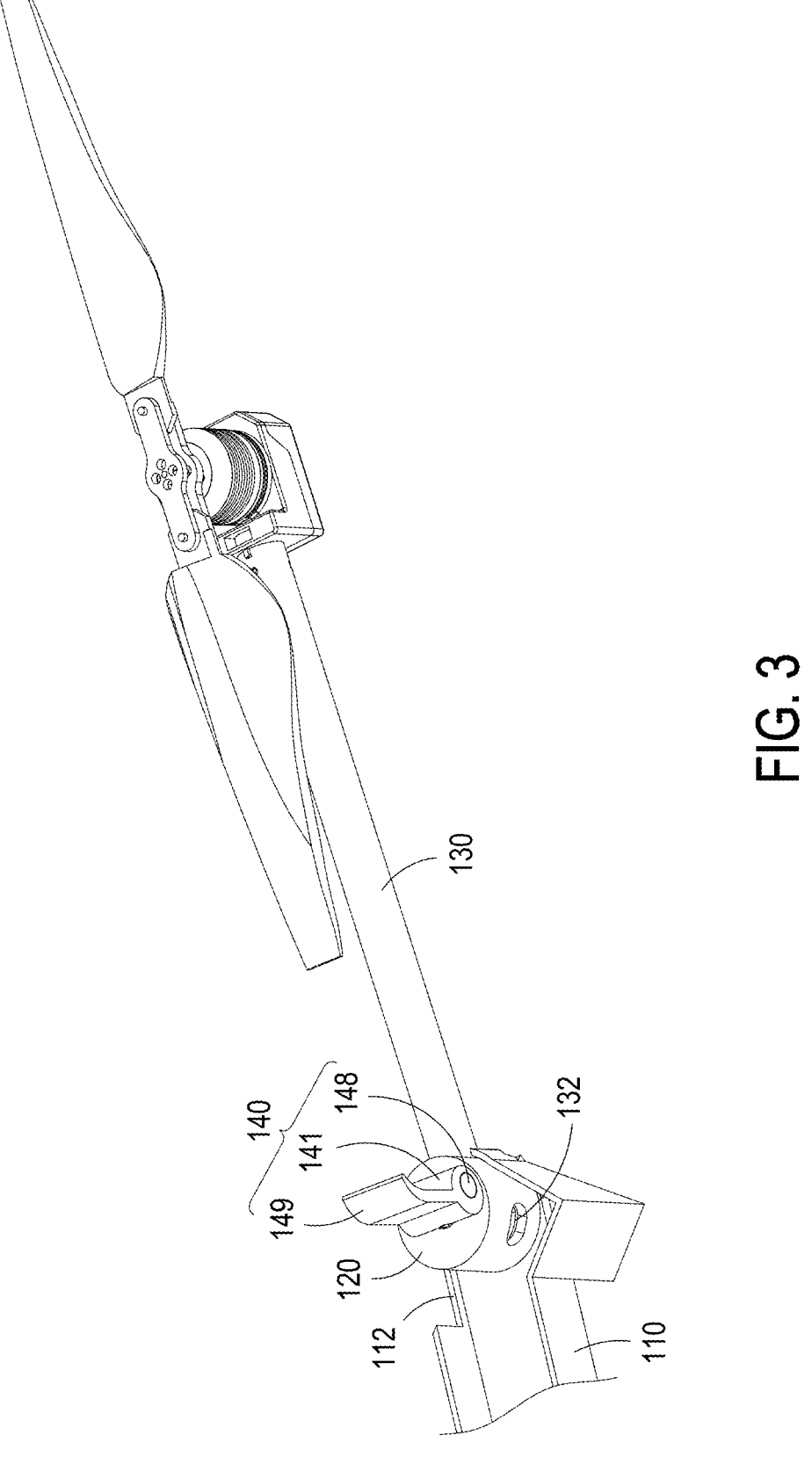
FIG. 3 is a partial schematic diagram of the unmanned aerial vehicle of FIG. 1.
Figure 4:
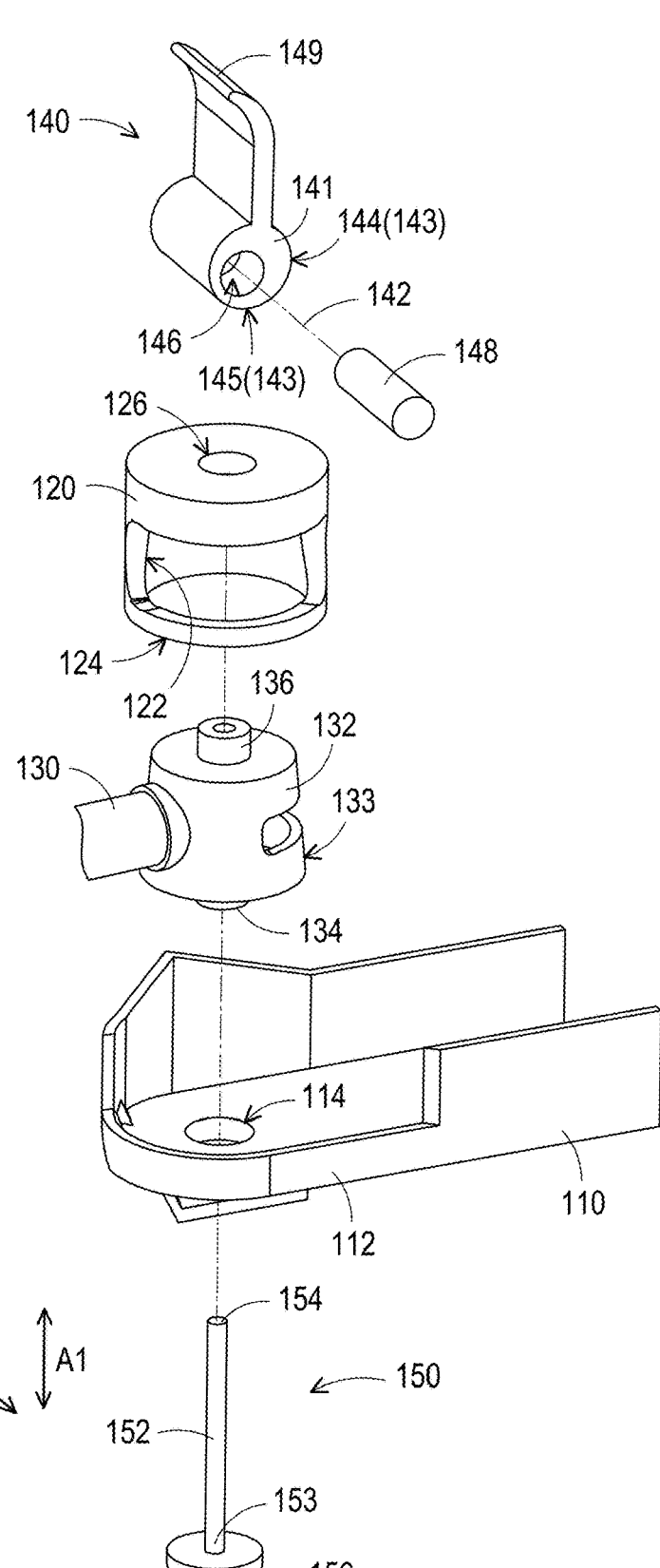
FIG. 4 is an exploded schematic diagram of a shaft base, a triggering member, a linking member, and part of an arm of the unmanned aerial vehicle of FIG. 1.

FIG. 3 is a partial schematic diagram of the unmanned aerial vehicle of FIG. 1. FIG. 4 is an exploded schematic diagram of a shaft base, a triggering member, a linking member, and part of an arm of the unmanned aerial vehicle of FIG. 1. Referring to FIG. 3 and FIG. 4, the body 110 includes a carrier 112. The shaft base 120 is disposed on the bearing base 112. The arm 130 includes a shaft member 132. The shaft member 132 is located between the shaft base 120 and the carrier 112. The shaft base 120 covers and surrounds the shaft member 132. The shaft member 132 is movably pivoted on the shaft base 120 along a first axis A1 (FIG. 4), so that the arm 130 is folded to the body 110 or unfolded from the body 110.

As shown in FIG. 4, the carrier 112 includes a first hole 114. The shaft member 132 includes a lower protrusion 134 located in the first hole 114 of the carrier 112. The shaft base 120 includes a second hole 126. The shaft member 132 includes an upper protrusion 136 located in the second hole 126 of the shaft base 120.

The shaft member 132 further includes a cone outer surface 133 extending along the first axis A1. The shaft base 120 includes a cone inner surface 122 corresponding to the cone outer surface 133. An outer diameter of the cone outer surface 133 gradually increases from the triggering member 140 toward the carrier 112 and presents a shape that is narrow at the top and wide at the bottom. The cone inner surface 122 also correspondingly presents the shape with a narrow top and a wide bottom.

Figure 5A:
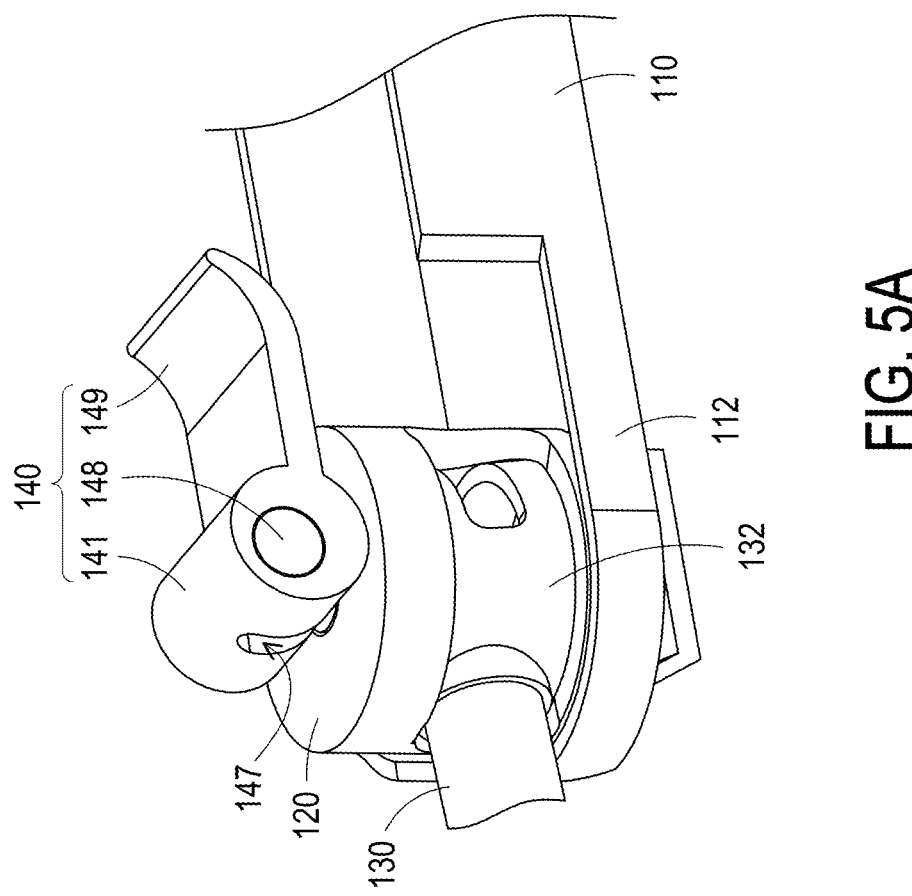
FIG. 5A is a schematic diagram of a triggering member in a fixed position after the components of FIG. 4 are assembled.
Figure 5B:
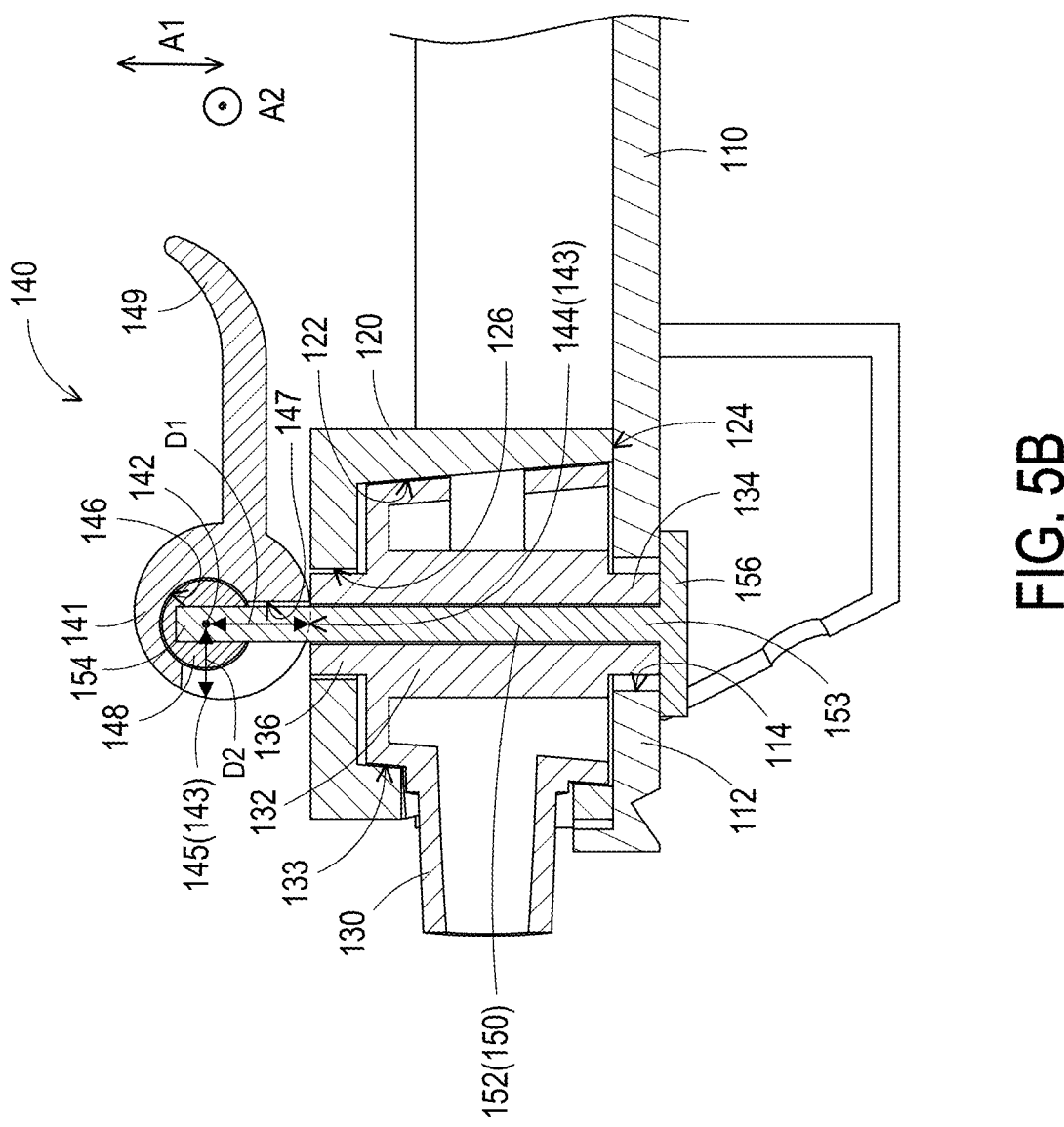
FIG. 5B is a schematic cross-sectional diagram of FIG. 5A.
Figure 6A:
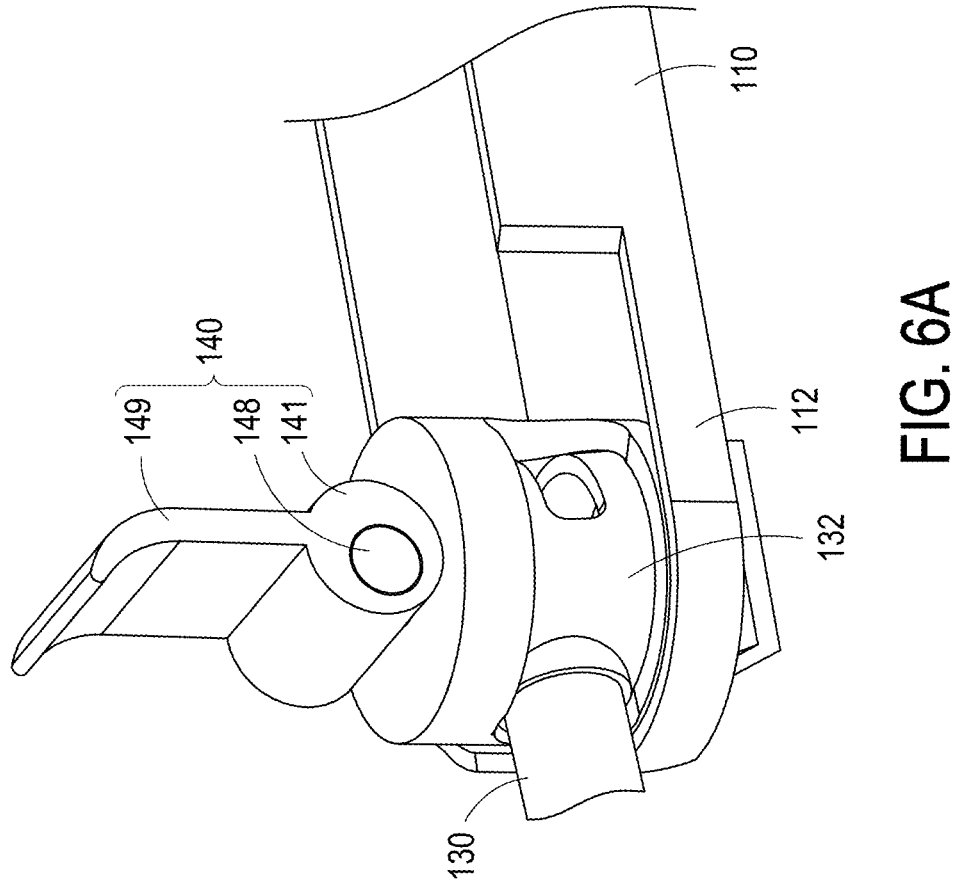
FIG. 6A is a schematic diagram of a triggering member in a release position after the components of FIG. 4 are assembled.
Figure 6B:
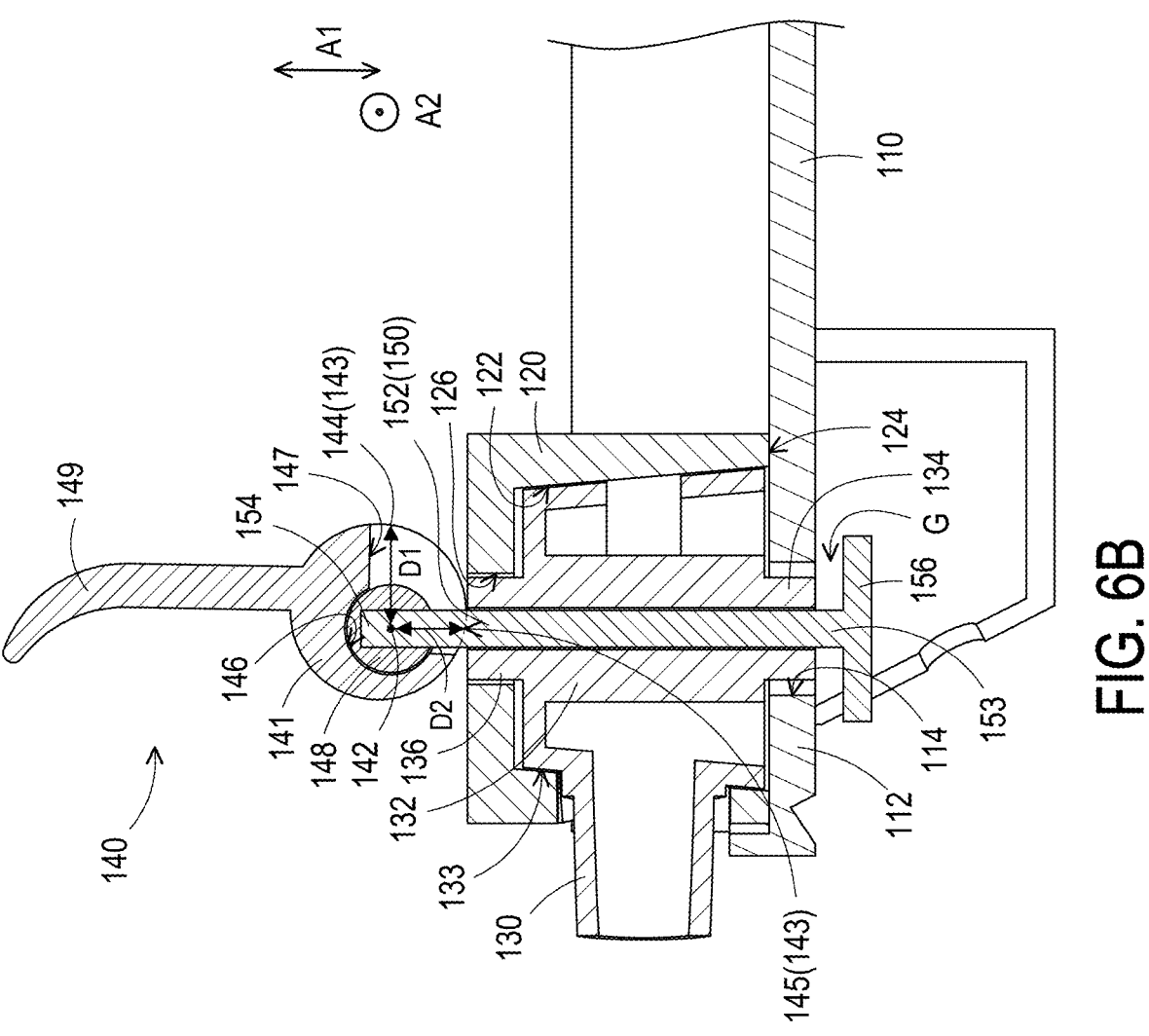
FIG. 6B is a schematic cross-sectional diagram of FIG. 6A.

The triggering member 140 includes an eccentric cam 141. A rotation center 142 of the eccentric cam 141 is rotatably disposed on the shaft base 120 along a second axis A2, so that the triggering member 140 rotates between a fixed position (as shown in FIG. 5A and FIG. 5B) and a release position (as shown in FIG. 6A and FIG. 6B). In this embodiment, the first axis A1 is perpendicular to the second axis A2, but is not limited thereto.

The eccentric cam 141 includes a handle portion 149 extending outward from a radial direction of the eccentric cam 141 for a user to trigger and adjust a position of the triggering member 140.

In addition, the eccentric cam 141 further includes a circular arc inner cavity 146 located at the rotation center 142. The triggering member 140 includes a pivotable circular arc body 148 disposed in the circular arc inner cavity 146.

The unmanned aerial vehicle 100 of this embodiment further includes a linking member 150. The linking member 150 includes a rod 152 and a stopper 156. The rod 152 extends along the first axis A1 and is movably passed through the first hole 114 of the carrier 112, the shaft member 132 of the arm 130, and the second hole 126 of the shaft base 120. The rod 152 is disposed between the eccentric cam 141 and the stopper 156, and the rod 152 extends to the rotation center 142 of the eccentric cam 141.

Specifically, the rod 152 includes a first end 153 and a second end 154 opposite to each other. The first end 153 of the rod 152 abuts the stopper 156. The second end 154 of the rod 152 is inserted into the circular arc body 148, so that the rod 152 and the stopper 156 are linked to the circular arc body 148.

In addition, the stopper 156 is located beside a lower surface 124 of the carrier 112 away from the shaft base 120. When the triggering member 140 rotates between the fixed position and the release position, the eccentric cam 141 rotates relatively to the circular arc body 148 and drives the circular arc body 148, the rod 152, and the stopper 156 to move along the first axis A1.

FIG. 5A is a schematic diagram of a triggering member in a fixed position after the components of FIG. 4 are assembled. FIG. 5B is a schematic cross-sectional diagram of FIG. 5A. Referring to FIGS. 5A and 5B, an outer edge 143 of the eccentric cam 141 includes a first area 144 and a second area 145. A distance D1 between the first area 144 and the rotation center 142 is greater than a distance D2 between the second area 145 and the rotation center 142.

When the triggering member 140 rotates to the fixed position, the first area 144 of the outer edge 143 of the eccentric cam 141 faces the shaft member 132. At this time, the first area 144 of the outer edge 143 of the eccentric cam 141 abuts the upper protrusion 136 of the shaft member 132. Since the distance D1 between the first area 144 and the rotation center 142 is greater, the rod 152 moves upward along with a position change of the rotation center 142 (also the position change of the circular arc body 148), so that the stopper 156 abuts the lower protrusion 134 of the shaft member 132 and the carrier 112 at the same time. Therefore, the shaft base 132 of the arm 130 is clamped between the first area 144 of the outer edge 143 of the eccentric cam 141 and the stopper 156, allowing the arm 130 to be fixed on the shaft base 120.

In addition, when the triggering member 140 is in the fixed position, the cone outer surface 133 of the shaft member 132 abuts against the cone inner surface 122 of the shaft base 120, so that the cone outer surface 133 of the shaft member 132 is clamped and fixed by the cone inner surface 122 of the shaft base 120. The design of the cone outer surface 133 of the shaft member 132 and the cone inner surface 122 of the shaft base 120 may also increase a contact area between the shaft member 132 and the shaft base 120, thereby increasing friction.

FIG. 6A is a schematic diagram of a triggering member in a release position after the components of FIG. 4 are assembled. FIG. 6B is a schematic cross-sectional diagram of FIG. 6A. Referring to FIGS. 6A and 6B, when the triggering member 140 rotates to the release position, the second area 145 of the outer edge 143 of the eccentric cam 141 faces the shaft member 132. Since the distance D2 between the second area 145 and the rotation center 142 is lesser, the rod 152 moves downward along with the position change of the rotation center 142 (also the position change of the circular arc body 148). The distance between the second area 145 of the outer edge 143 of the eccentric cam 141 and the stopper 156 increases, so that there is at least one gap G between at least one of the second area 145 of the outer edge 143 of the eccentric cam 141 and the stopper 156 and the shaft member 132.

In this embodiment, due to an influence of gravity, the second area 145 of the outer edge 143 of the eccentric cam 141 abuts the shaft member 132 of the arm 130, and the gap G is generated between the stopper 156 and the shaft member 132. Therefore, the shaft member 132 of the arm 130 is not tightly sandwiched between the second area 145 of the outer edge 143 of the eccentric cam 141 and the stopper 156. Therefore, the arm 130 is adapted to rotate relatively to the shaft base 120. When the arm 130 rotates to the desired position, the arm 130 may be fixed by simply moving the triggering member 140 to the fixed position again (as shown in FIG. 5B), which is easy to operate, having a function of compact and simple structure, small size, reliability, and low maintenance cost.

In addition, the eccentric cam 141 includes a fan-shaped cavity 147 connected to the circular arc inner cavity 146. It may be seen from FIG. 5B and FIG. 6B that when the triggering member 140 rotates between the fixed position and the release position, a relative position of the rod 152 in the fan-shaped cavity 147 is changed. The fan-shaped cavity 147 is used to make space so that when the eccentric cam 141 rotates, the rod 152 may not be interfered with and may operate smoothly.

To sum up, the arm of the unmanned aerial vehicle of the disclosure is suitable to be folded to the body or unfolded from the body. Therefore, the arm may be folded for easy portability. In addition, the eccentric cam of the triggering member of the unmanned aerial vehicle is rotatably disposed on the shaft base, so that the triggering member rotates between the fixed position and the release position. The rod of the linking member of the unmanned aerial vehicle is disposed between the eccentric cam and the stopper, and the rod extends to the rotation center of the eccentric cam. When the triggering member of the unmanned aerial vehicle of the disclosure is rotated to the fixed position, the shaft member of the arm is clamped between the outer edge of the eccentric cam and the stopper, so that the arm is fixed on the shaft base. Therefore, the arm may be well fixed when folded or unfolded. In addition, when the triggering member is rotated to the release position, the distance between the outer edge of the eccentric cam and the stopper increases, so that there is the at least one gap between the at least one of the outer edge of the eccentric cam and the stopper and the shaft member. Therefore, the arm is adapted to rotate relatively to the shaft base. When the arm rotates to the desired position, the arm may be fixed by simply moving the triggering member to the fixed position again, which is easy to operate, thereby achieving effects of compact and simple structure, small size, reliability, and low maintenance cost.

What is claimed is:

1. An unmanned aerial vehicle, comprising:
    a body;
    a shaft base, disposed outside the body;
    an arm, comprising a shaft member, wherein the shaft member is movably pivoted on the shaft base along a first axis so that the arm is folded to the body or unfolded from the body;
    a triggering member, comprising an eccentric cam, wherein a rotation center of the eccentric cam is rotatably disposed on the shaft base along a second axis, so that the triggering member rotates between a fixed position and a release position, and the second axis is perpendicular to the first axis; and
    a linking member, comprising a rod and a stopper, wherein the rod extends along the first axis and is movably passed through the shaft member, the rod is disposed between the eccentric cam and the stopper, and the rod extends to the rotation center of the eccentric cam;
    wherein in response to the triggering member being rotated to the fixed position, the shaft member is clamped between an outer edge of the eccentric cam and the stopper, so that the arm is fixed on the shaft base;
    wherein in response to the triggering member being rotated to the release position, a distance between the outer edge of the eccentric cam and the stopper increases, so that there is at least one gap between at least one of the outer edge of the eccentric cam and the shaft member, and the stopper and the shaft member, allowing the arm to be adapted to rotate relatively to the shaft base, wherein the shaft base covers and surrounds the shaft member, the shaft member comprises a cone outer surface extending along the first axis, the shaft base comprises a cone inner surface corresponding to the cone outer surface, and in response to the triggering member being rotated to the fixed position, the cone outer surface of the shaft member abuts against the cone inner surface of the shaft base, wherein an outer diameter of the cone outer surface gradually increases from the eccentric cam toward the stopper.

2. The unmanned aerial vehicle according to claim 1, wherein in response to the triggering member being rotated to the fixed position, the outer edge of the eccentric cam comprises a first area and a second area, and a distance between the first area and the rotation center is greater than a distance between the second area and the rotation center, in response to the triggering member being rotated to the fixed position, the first area abuts the shaft member, and in response to the triggering member being rotated to the release position, the second area abuts the shaft member.

3. The unmanned aerial vehicle according to claim 1, wherein the body comprises a carrier, the shaft base is disposed on the carrier, the shaft member is located between the shaft base and the carrier, the carrier comprises a first hole, the rod passes through the first hole, and the stopper is located beside a lower surface of the carrier away from the shaft base.

4. The unmanned aerial vehicle according to claim 3, wherein the shaft member comprises a lower protrusion located in the first hole of the carrier, and in response to the triggering member being rotated to the fixed position, the stopper abuts the lower protrusion and the carrier at the same time.

5. The unmanned aerial vehicle according to claim 1, wherein the shaft base comprises a second hole, the shaft member comprises an upper protrusion, the upper protrusion is located in the second hole of the shaft base, and in response to the triggering member being rotated to the fixed position, the outer edge of the eccentric cam abuts the upper protrusion.

6. The unmanned aerial vehicle according to claim 1, wherein the eccentric cam comprises a circular arc inner cavity located at the rotation center, the triggering member comprises a pivotable circular arc body disposed in the circular arc inner cavity, the rod is inserted into the circular arc body, and in response to the triggering member rotating between the fixed position and the release position, the eccentric cam rotates relatively to the circular arc body and drives the circular arc body and the rod to move along the first axis.

7. The unmanned aerial vehicle according to claim 5, wherein the eccentric cam comprises a fan-shaped cavity connected to a circular arc inner cavity, and in response to the triggering member rotating between the fixed position and the release position, a relative position of the rod within the fan-shaped cavity is changed.

8. The unmanned aerial vehicle according to claim 1, wherein the eccentric cam comprises a handle portion extending outward from a radial direction of the eccentric cam.

* * * * *